[19] United States Patent
Burns et al.

[11] Patent Number: 4,528,665
[45] Date of Patent: Jul. 9, 1985

[54] GRAY CODE COUNTER WITH ERROR DETECTOR IN A MEMORY SYSTEM

[75] Inventors: Gary D. Burns, Cottage Grove; Donald W. Mackenthun, Fridley; Scott D. Schaber, St. Paul, all of Minn.

[73] Assignee: Sperry Corporation, New York, N.Y.

[21] Appl. No.: 491,464

[22] Filed: May 4, 1983

[51] Int. Cl.³ .............................................. G06F 11/10
[52] U.S. Cl. ...................................................... 371/51
[58] Field of Search .......................... 365/222; 371/51

[56] References Cited

U.S. PATENT DOCUMENTS 3,760,379 9/1973 Nibby, Jr. et al. .................. 365/222
4,271,521 6/1981 Mahmood .............................. 371/51
4,295,219 10/1981 Draper et al. ......................... 371/51

Primary Examiner—Jerry Smith
Assistant Examiner—Mark Ungerman
Attorney, Agent, or Firm—Charles A. Johnson; Kenneth T. Grace; Marshall M. Truex

[57] ABSTRACT

An improved dynamic memory system including through-checking and error detection of the refresh counter is described. A refresh counter that provides parity of the refresh count for through-checking, of refresh addresses is shown. Error detecting circuitry is utilized in conjunction with the refresh counter and the parity generating circuitry to detect errors in functionality of the refresh counter. The refresh counter is a Gray code counter constructed of a double rank of latches operable with code generating logic circuits for determining the sequence of generation of Gray code groupings.

14 Claims, 19 Drawing Figures

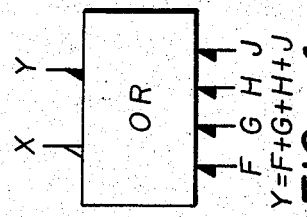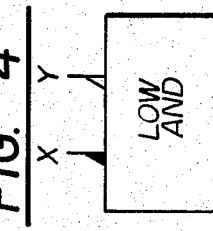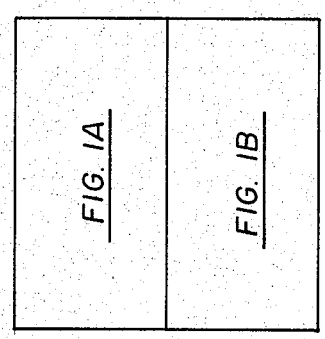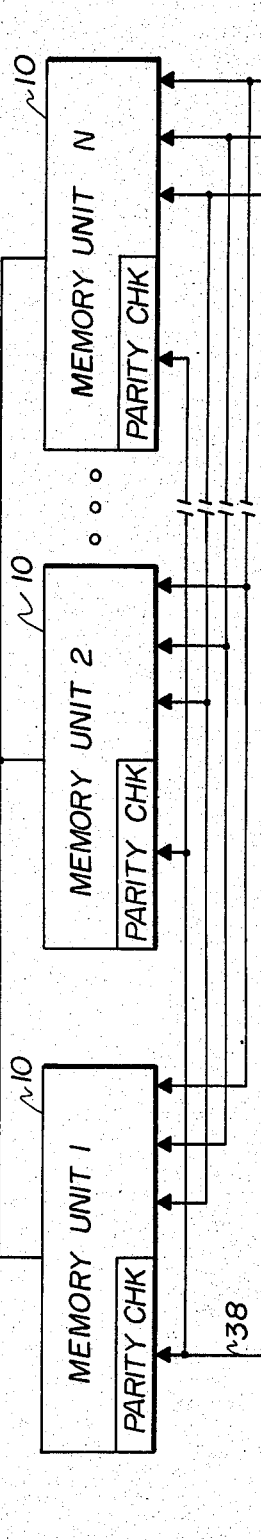

FIG. 2

| DECIMAL | BINARY<br>4 3 2 1 0 | GRAY<br>B4 B3 B2 B1 B0 | PARITY<br>(GRAY) | |
|---|---|---|---|---|
| 0 | 0 0 0 0 0 | 0 0 0 0 0 | 1 | |
| 1 | 0 0 0 0 1 | 0 0 0 0 1 | 0 | ⤺70 |
| 2 | 0 0 0 1 0 | 0 0 0 1 1 | 1 | |
| 3 | 0 0 0 1 1 | 0 0 0 1 0 | 0 | ⤺72 |
| 4 | 0 0 1 0 0 | 0 0 1 1 0 | 1 | |
| 5 | 0 0 1 0 1 | 0 0 1 1 1 | 0 | |
| 6 | 0 0 1 1 0 | 0 0 1 0 1 | 1 | |
| 7 | 0 0 1 1 1 | 0 0 1 0 0 | 0 | ⤺76 |
| 8 | 0 1 0 0 0 | 0 1 1 0 0 | 1 | |
| 9 | 0 1 0 0 1 | 0 1 1 0 1 | 0 | |
| 10 | 0 1 0 1 0 | 0 1 1 1 1 | 1 | |
| 11 | 0 1 0 1 1 | 0 1 1 1 0 | 0 | ⤺72 |
| 12 | 0 1 1 0 0 | 0 1 0 1 0 | 1 | |
| 13 | 0 1 1 0 1 | 0 1 0 1 1 | 0 | |
| 14 | 0 1 1 1 0 | 0 1 0 0 1 | 1 | |
| 15 | 0 1 1 1 1 | 0 1 0 0 0 | 0 | ⤺74 |
| 16 | 1 0 0 0 0 | 1 1 0 0 0 | 1 | |
| 17 | 1 0 0 0 1 | 1 1 0 0 1 | 0 | |
| 18 | 1 0 0 1 0 | 1 1 0 1 1 | 1 | |
| 19 | 1 0 0 1 1 | 1 1 0 1 0 | 0 | ⤺72 |
| 20 | 1 0 1 0 0 | 1 1 1 1 0 | 1 | |
| 21 | 1 0 1 0 1 | 1 1 1 1 1 | 0 | |
| 22 | 1 0 1 1 0 | 1 1 1 0 1 | 1 | |
| 23 | 1 0 1 1 1 | 1 1 1 0 0 | 0 | ⤺76 |
| 24 | 1 1 0 0 0 | 1 0 1 0 0 | 1 | |
| 25 | 1 1 0 0 1 | 1 0 1 0 1 | 0 | |
| 26 | 1 1 0 1 0 | 1 0 1 1 1 | 1 | |
| 27 | 1 1 0 1 1 | 1 0 1 1 0 | 0 | ⤺72 |
| 28 | 1 1 1 0 0 | 1 0 0 1 0 | 1 | |
| 29 | 1 1 1 0 1 | 1 0 0 1 1 | 0 | |
| 30 | 1 1 1 1 0 | 1 0 0 0 1 | 1 | |
| 31 | 1 1 1 1 1 | 1 0 0 0 0 | 0 | |

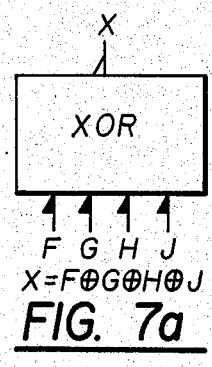
FIG. 7a
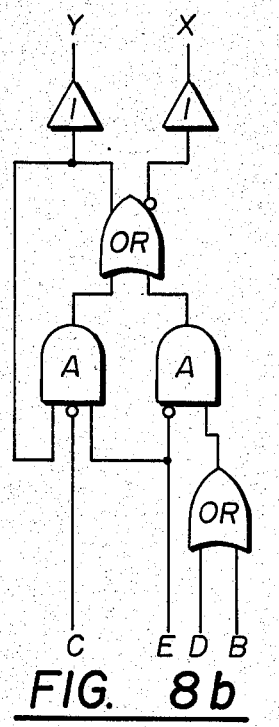
FIG. 8b
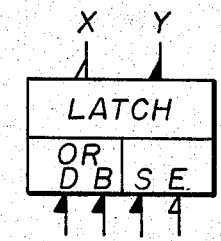
FIG. 8c
TRUTH TABLE
| IN | | | | OUT | |
|---|---|---|---|---|---|
| D | B | C | E | X | Y |
|   |   | H | H | H | L |
|   |   | ↓ | ↑ | U | U |
|   |   | L | H | – | – |
| L | L |   |   | H | L |
| H |   |   |   | L | H |
|   | H |   |   | L | H |
FIG. 7b
TRUTH TABLE
| IN | | | | OUT |
|---|---|---|---|---|
| F | G | H | J | X |
| L | L | L | L | H |
| L | L | L | H | L |
| L | L | H | L | L |
| L | L | H | H | H |
| L | H | L | L | L |
| L | H | L | H | H |
| L | H | H | L | H |
| L | H | H | H | L |
| H | L | L | L | L |
| H | L | L | H | H |
| H | L | H | L | H |
| H | L | H | H | L |
| H | H | L | L | H |
| H | H | L | H | L |
| H | H | H | L | L |
| H | H | H | H | H |
$X = F \oplus G \oplus H \oplus J$
FIG. 8d
LATCH (OR D B S E) with outputs X, Y
FIG. 8a
LATCH (OR D B C E) with outputs X, Y
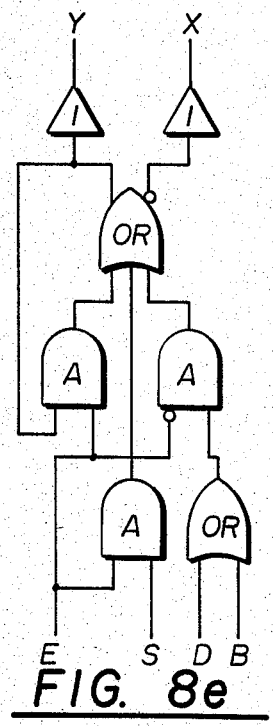
FIG. 8e
FIG. 8f
TRUTH TABLE
| IN | | | | OUT | |
|---|---|---|---|---|---|
| D | B | S | E | X | Y |
| L | L |   |   | H | L |
| H |   |   |   | L | H |
|   | H |   |   | L | H |
|   |   | H | H | L | H |
|   |   | ↓ | ↑ | U | U |
|   |   | L | H | – | – |

GRAY CODE COUNTER WITH ERROR DETECTOR IN A MEMORY SYSTEM

BACKGROUND OF THE INVENTION

1. Field of the Invention

The present invention relates to an improvement to data processing systems employing volatile memory systems that utilize counters to access and refresh the storage devices. More particularly, it relates to a counter for use in a memory system wherein the parity of each count is determined and available for through-checking, and detects errors in counter operation as they occur.

2. State of the Prior Art

The use of binary counters in digital data processing systems has long been known. Counters have been employed in a variety of computing functions. An early and well-known use of a binary counter was to generate sequential addresses comprised of binary digits (bits) for accessing a memory for reading out stored instruction words sequentially for a binary digital data processing system. It was recognized at an early stage that errors in operation of such instruction address counters would cause the computing system to execute the incorrect sequence of instructions. Early attempts at checking for such counter errors involved the use of duplicate counters and the comparison of the results. A much improved system utilizing substantially fewer components involved the addition of logic circuits to the counter circuit that would generate the appropriate parity for successive counts. As is known, parity systems involve the use of additional bit positions to a group of bits for which parity is to be checked, wherein the additional bit position is assigned a value dependent upon the count of the one signals in the word. When odd parity is utilized, the parity bit will be set to a value one when the count of ones in the associated word is even. Alternatively, when the count of ones in the word is odd, the parity bit would be set to zero. The reverse conditions are employed when even parity is the system selected.

Determination of parity for a binary counter requires complex manipulation of each stage in the counter due to the fact that different numbers of bit positions will be altered for successive counts. A system that accomplishes parity generation for an instruction counter is shown in U.S. Pat. No. 3,192,362 to Cheney. A disadvantage of the system described by Cheney is the necessity of storing the current count and the next subsequent count so that parity can be evaluated and the actual count signal combinations can be compared.

In volatile memory systems, often referred to as dynamic memory systems, that utilize charge storage memory elements of the type requiring periodic refreshing to restore the contents thereof, a great deal of prior art exists surrounding the determination of appropriate systems to accomplish the refreshing functions. The memory array is typically comprised of a plurality of individual cells, arranged in rows and columns, whose binary representations are dependent on and determined by the capacitive charge that is stored therein. It is of course known, that if the volatile memory cells are not periodically refreshed either by direct addressing access, or by specific refreshing, the contents of the memory cells will be lost. Examples of this type of volatile memory cell include systems for storing a charge between the substrate and the gates of fieldeffect transistors, the storage of charge on capacitors having one or more associated transistors, or in some other charge storage structure. Example volatile memory devices are shown and described in U.S. Pat. No. 4,207,618 to White et al, and U.S. Pat. No. 3,387,286 to Dennard. The various types of memory cells will have different refresh timing requirements, it being understood that it is necessary to complete a refresh operation at least once during the device's Refresh Requirement Interval (RRI).

It is generally known that accessing memory cells for reading or writing does not occur simultaneously with accessing for refresh. In this regard, refreshing of memory cells is generally considered to be overhead to the operation of the system, with significant attempts made to minimize the impact of refresh on system operation.

One system of refresh can be considered to be the so-called "burst mode" of refresh. In systems of this type, care is taken to determine when it is necessary to refresh all or some major segment of the memory system, and when refresh is required, all accessing for reading and writing is interrupted temporarily. During this interruption, the memory is refreshed under control of a refresh counter. An example of this type of burst mode refreshing is shown in U.S. Pat. No. 3,387,286 to Dennard.

Another approach to refreshing the memory system has been designated the interleaved mode. In such systems, the control circuitry determines times of operation of when the access to the memory system will be neither reading nor writing. During such determined times, the system is free to refresh memory cells. The reading and writing is not interrupted per se, but is interleaved for access with refreshing on a noninterfering basis. An example of interleaved refreshing is shown and illustrated in U.S. Pat. 3,811,117 to Anderson et al. It is of course understood that interleaving of refresh may or may not provide sufficient access to the memory system to satisfy the Refresh Requirement Interval for all memory cells. In the event that it is not sufficient, the reading and writing functions may have to be interrupted to complete the refresh of the entire memory system within its RRI. Other examples of various refresh systems are shown in U.S. Pat. Nos. 4,357,686 to Scheuneman, 3,760,379 to Nibby et al., 3,719,932 to Cappon, 4,158,883 to Kadono et al., 4,084,154 to Panigrahi, 4,249,247 to Patel, and 3,810,129 to Behman et al.

In order to provide reliability of operation of data processing systems, there has been an ever-increasing use of through-checking techniques. "Through-checking" in this sense is understood to mean checking of data words or bit groupings through the use of parity or error correction code systems. The checking of transfers of data words or other bit groupings is often accomplished at major transfer points. For example, it is common in memory systems to utilize an error correction code system that allows memory to be checked for errors when data words are read out. Further, individual words or bit groupings are often checked at transfer points within the system. For example, a memory address is characteristically subjected to a parity check when transferred from the processing unit to the memory unit prior to accessing the memory. The concept of through-checking is being ever-expanded such that more and more transfer points are checked.

In the attempt to provide more reliable operations, system designers have also developed many techniques for circuitry to be self-checking to determine whether it is operating properly. Through the use of error detecting techniques and circuits, malfunctions can be detected, isolated, and identified for appropriate maintenance.

Prior art refresh systems have employed refresh counters, but have not provided through-checking capabilities in conjunction with error detecting capabilities.

Some dynamic memory systems employ a regenerate system. Memory addresses are periodically read out and the read data subjected to error detection and correction processes. When correctable errors are detected, the corrected data words are written back into the memory, thereby enhancing the probability of correct read out when accessed. As with the refresh system, a regenerate system must provide access control to all memory cells, but need not be in binary order.

OBJECTS

It is a primary object of the invention to provide an improved volatile memory refresh system with enhanced through-checking and error detection capabilities.

Yet another object of the invention is to provide an improved refresh counter for use in a volatile memory refresh system.

Yet a further object of the invention is to provide an improved volatile memory refresh system utilizing a Gray code counter in the memory refresh system.

Still another object of the invention is to provide a Gray code counter in combination with parity generating circuitry for through-checking the refresh addresses, together with error detecting circuitry for detecting malfunctions of the Gray code counter.

Another object of the invention is to provide an improved Gray code counter for use in memory refresh system that can be readily fabricated in gate array technology.

Yet another object of the invention is to provide an improved Gray code counter in combination with parity generating circuitry for through-checking counts generated to be used as regeneration addresses, together with error detecting circuitry for detecting errors in operation of the Gray code counter.

Other and more detailed purposes and objectives will become apparent from a consideration of the drawings and the following detailed description of the preferred embodiment.

SUMMARY OF THE INVENTION

The invention includes an improved refresh system for use with a volatile memory. The refresh system incorporates a refresh counter that provides refresh addresses with parity that are utilized in conjunction with parity checking circuitry for through-checking the refresh addresses. The memory refresh system incorporates a Gray code counter circuit for use as the memory refresh counter, and further includes error detecting circuitry for detecting erroneous operation of the refresh counter. The combination of the Gray code counter, the parity generating circuit and the error detecting circuit provide through-checkable addresses for use in refreshing or regenerating data stored in dynamic memories.

BRIEF DESCRIPTION OF THE DRAWINGS

FIG. 1A and FIG. 1B, when arranged as shown in FIG. 1 is a block diagram of a volatile memory system having an improved memory refresh system that provides through-checking of the memory refresh addresses and detection of errors in the memory refresh counter.

FIG. 2 is a table illustrating the comparison of Gray code generation to binary and decimal codes, together with parity generation for the Gray codes.

FIG. 4 is a logic block diagram of an OR circuit providing true and complement output signals.

FIG. 5 is a Truth Table applicable to logical OR function for high signals and the logical AND function of low signals.

FIG. 6 is a logic block diagram symbol of a Low AND circuit providing true and complement output signals.

FIG. 7a is a logic block diagram of an Exclusive-OR (XOR) circuit.

FIG. 7b is a Truth Table of the logical functioning of the Exclusive-OR (XOR) circuit of FIG. 7a.

FIG. 8a is a logic block diagram symbol of a Latch that clears on C.

FIG. 8b is a detailed logic symbol illustration of the Latch of FIG. 8a.

FIG. 8c is a Truth Table describing the functioning of the Latch of FIG. 8a.

FIG. 8d is a logic block diagram symbol for a Latch that sets on S.

FIG. 8e is a detailed logic symbol illustration of the Latch of FIG. 8d.

FIG. 8f is a Truth Table describing the functioning of the Latch of FIG. 8d.

DESCRIPTION OF THE PREFERRED EMBODIMENT

Figure 1B:
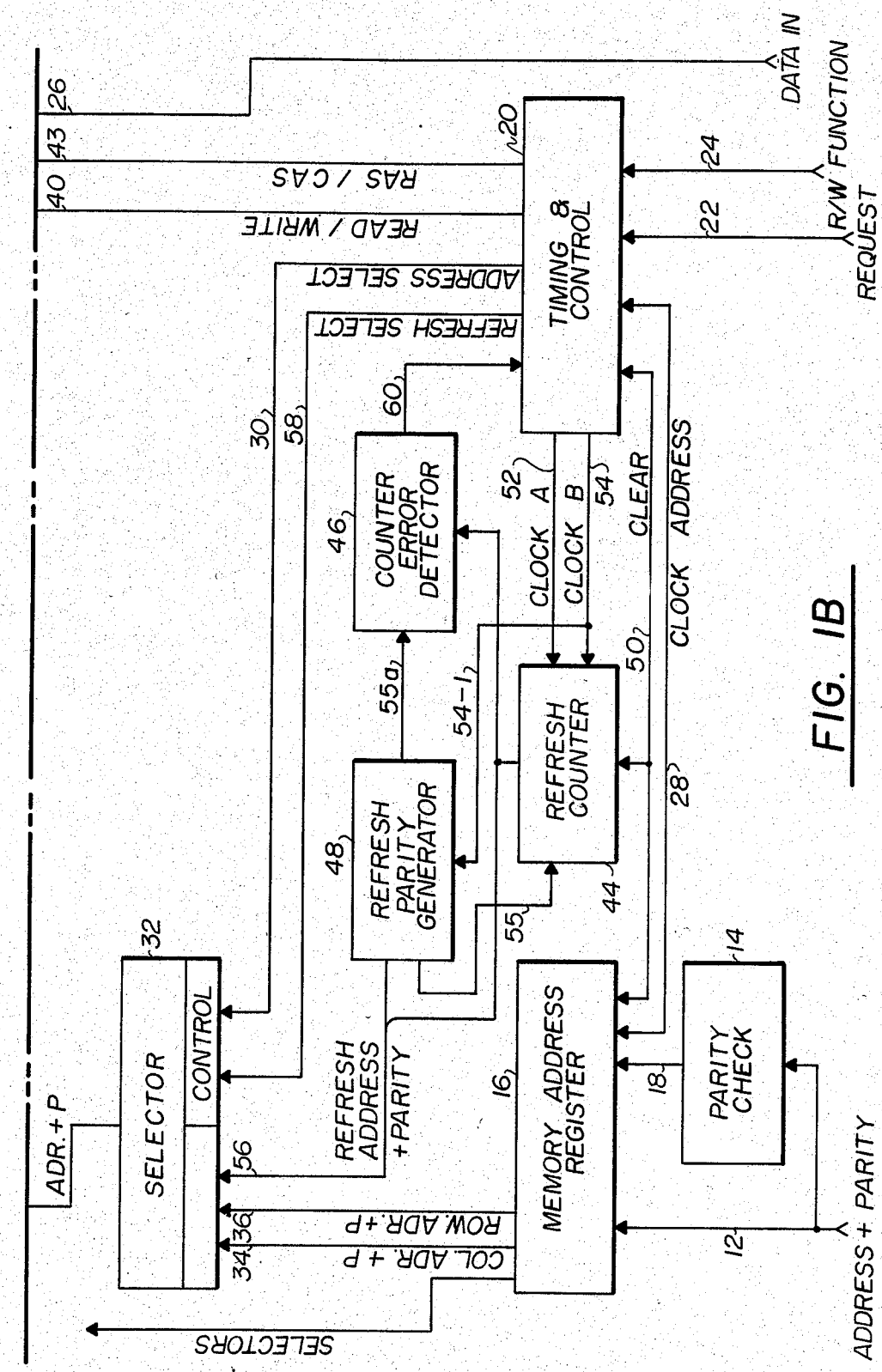

FIG. 1 is a block diagram of a volatile memory system having an improved memory refresh system that provides through-checking of the memory refresh addresses and detection of errors in the memory refresh counter. The volatile memory system includes a plurality of Memory Units 10, which are characteristically each comprised of a two dimensional array of memory cells arranged in rows and columns. These volatile Memory Units are also referred to as dynamic memories, and are available commercially. The number N of Memory Units 10 is often selected to match the number of bits desired for the data words and the particular data processing system. If the array capacity of the Memory Units 10 is insufficient for the memory capacity desired for data processing system, one or more additional sets of Memory Units can be utilized. It is then necessary only to select between banks of arrays of Memory Units in addition to selecting the row and column positions to completely define the location of the data to be accessed. It is of course understood that the individual Memory Units 10 characteristically include logic circuitry for checking the parity of addresses applied thereto, circuitry for receiving and holding the row and column address information, recording circuitry and amplifiers for reading, together with logic circuitry necessary to time and control the reading and writing functions. None of this circuitry will be shown or described in detail, since it is known, available in commercial parts, and does not limit the construct of the invention.

To access the data stored in the memory system, and Address plus Parity is received on line 12 from a data processing unit (not shown). The Address plus Parity is applied to a Parity Check circuit 14 and to the Memory Address Register 16. The Parity Check circuit 14 is of a type well-known, and checks the parity of the received Address to determine accuracy of its reception. If correct, an enabling signal is provided on line 18, and the Memory Address Register 16 is partially enabled to receive and store the Address and its Parity. It is of course understood that Parity can be a single bit for the entire Address, or that there can be multiple Parity bits, each associated with an individual field of the Address. It is the latter arrangement that is contemplated for use with the preferred embodiment of the invention.

The memory system includes a Timing and Control 20. The Timing and Control circuitry 20 includes logic circuitry for timing and controlling the reading and writing of data words, and includes logic circuitry for controlling the refresh of the memory sytem. As indicated above, the method and manner of determining the requirement for refresh, and the timing of the refresh can vary from system to system. The present invention for determining refresh addresses will work equally well for the various types of refresh systems.

To access the memory, a Request signal is received on line 22, and the selection of whether there is to be a Read or Write function, shown as the R/W Function, is received on line 24. For a Write function, the Data to be written is received on line 26. The signals are all from the associated data processing unit (not shown). The Request signal is an indication to the Timing and Control that some function is desired to be accomplished. The Timing and Control will determine whether the memory system is in a condition to accommodate the Request, and will issue a Clock Address signal on line 28 to enable the loading of the Address in the Memory Address Register 16 when the memory system is in a condition to execute the Request. The Timing and Control 20 issues a control signal Address Select on line 30 to the Selector 32, thereby allowing the Column Address plus Parity to be loaded from line 34 and the Row Address plus Parity to be loaded from line 36. The Column Address and Row Address, together with their respective parities, are selected through Selector 32 and provided on lines 38 to the Memory Units 10.

The Timing and Control 20 also issues a Read or Write enable signal on line 40 to each of the Memory Units 10 dependent upon the Function selected from line 24. The selection on line 40 will determine whether the Data received on line 26 will be written into the Memory Units 10, at the Address specified on line 38, or whether the Memory Units 10 will cause the addressed location to read data out on line 42. As a part of the accessing, Timing and Control also provides the Row Address Strobe (RAS) and Column Address Strobe (CAS) on line 43 to all Memory Units 10.

In order to refresh the dynamic memory system, a Refresh Counter 44 is utilized in conjunction with a Counter Error Detector 46 and a Refresh Parity Generator 48. When Timing and Control 20 is initialized at turn-on, a Clear signal will be issued on line 50 to clear the contents of Memory Address Register 16 and the Refresh Counter 44. Subsequently, Timing and Control 20 will issue a Clock A pulse on line 52 and a Clock B pulse on line 54 each time that it determines that a Refresh cycle of one address should occur. As will be described in more detail below, Refresh Counter is a Gray code counter, and as will be seen below, parity bit alters for each advance of the counter. This is accomplished by the application of Clock B on line 54-1 to the Refresh Parity Generator 48, and the parity bit is applied on line 55 to the Refresh Counter, and on line 55a to the Counter Error Detector. The resultant Refresh Address plus its Parity is provided on line 56 as one of the alternative selections for Selector 32. When Timing and Control 20 determines that a Refresh cycle should be executed, it issues a Refresh Select signal on line 58 to the Control portion of Selector 32, thereby selecting the Refresh Address plus its Parity for transmission on line 38 to the Memory Units 10. The contents of the Refresh Counter 44 is also provided as an input to Counter Error Detector 46 which functions to determine whether the Refresh Counter is functioning properly. A detected error of operation results in a signal being provided on line 60 to Timing and Control 20 where corrective action can be taken. The various types of corrective action that can occur would be to interrupt the refresh operation and the functioning of the memory unit and notify an associated data processing system, reinitialize and retry the refresh function, or to note the error occurrence and continue to attempt to refresh with errors being accumulated and interruption occurring only after some threshold number of errors are detected. These various types of responses to detected errors will depend upon the system environment, the sophistication of the system, and do not limit the functioning of the Refresh Counter with its attendant through-checking and error detection capabilities.

It is understood that a counter similar to Refresh Counter 44 could be provided, along with an addition parity generator and an additional counter error detector circuit (none of which are shown in detail), to be utilized under control of Timing and Control 20 to provide regenerate addresses. The regenerate addresses with associated parity, would comprise a third set of addresses, and would be appropriately selected by Selector 32 by Timing and Control 20. Various regenerate systems are known, as are the various error detecting and correcting systems utilized therewith. No detailed showing of the regenerate system will be shown, it being understood that the Gray code counter hereafter described in detail, will serve to provide the regenerate addresses, along with through-checking and error detection.

FIG. 2 is a table illustrating the comparison of Gray code generation to binary and decimal codes, together with parity generation for the Gray codes. It is noted that the normal type of Refresh Counter utilized in prior art systems incorporates a binary count. The selection of a binary counter is consistent with the normal usage in binary arithmetic and binary sequential addressing. There is nothing, however, that requires the Refresh Counter to function in binary even though utilized in a binary digital data processing system. The only requirement for the Refresh Counter is that it function to provide Refresh Addresses that cover all address combinations of the binary addressing system. The mere fact that units are not refreshed in binary order is of no consequence provided that all memory locations are in fact refreshed during the appropriate time cycles to avoid loss of any data.

FIG. 2 illustrates the comparison of a 5-bit sequential binary count to a 5-bit Gray code count. The Parity illustrated is for the Gray code, and the Decimal column illustrates the decimal equivalent of both the binary and the Gray code combinations. Only 5-bits of Gray code is illustrated, it being understood that the detailed description of the specific logic that will be set forth below will describe an 8-bit Gray code counter. The example of FIG. 2 need not be extended for the additional bit positions because the patterns tend to repeat as will be further described.

With regard to parity generation for a Gray code, the preferred embodiment utilizes an odd parity sytem. This means that the total count of ones in the combination of the Gray code bits plus the Parity bit should result in an odd count. If it does not, the system has malfunctioned and some corrective action must be taken.

The concept of the Gray code is that no more than one bit position in the code will change for each sequential incrementation of the counter. This necessarily means that the Parity bit for each successive count will alternate.

A comparison of the Gray code to the binary code will quickly illustrate that the incrementation of the binary code can result in the changing from one to four bit positions depending upon the count's sequence. This differential changing of bit positions renders the generation of parity considerably more complex for a binary counter than is required for the Gray code counter. Accordingly, a substantial saving in hardware is achieved through the use of the Gray code Refresh Counter with the Parity bit simply being complemented for each advance to the counter.

To understand the functioning of the Gray code counter, some basic relationships will be described. B0 will change each time the previous Parity is one, for example shown at box 70. A consideration of the code sequences will indicate this relationship and at B0 alters every two cycles. B1 will change each time the previous B0 is one and the previous Parity is zero. This condition is illustrated within box 70, and the B1 count on the decimal 2 line will be seen to have changed from zero to one while B0 remains unchanged and Parity is altered. It will be seen that once the counter is functioning, the position B1 will be altered every four cycles of the counter. B2 will change each time the previous B1 is one and the previous B0 is zero and the previous Parity is zero. For example, box 72 illustrates the previous count condition that causes B2 to change on the next successive count cycle. A consideration of the sequence of alterations of B2 will indicate that once the counter is in operation, and it has initially changed its state, B2 will alternate states on an eight cycle basis. Subsequent alterations to the B2 position are illustrated by box 72 for the previous count conditions.

The general relationship for a bit position X to change will be determined that a change will occur when the previous BX-1 is one and BX-2, BX-3 . . . BX-X are all zero and the previous Parity is zero, where X is the highest ordered bit of the counter. This general case for the position B4 will be shown by the previous state shown within block 74 for the 5-bit example. This same general relationship can be applied to each bit position, and it can be seen that boxes 76 define the previous state resulting in the alteration of the B3 position.

The foregoing described relationship of the bit positions of the Gray code counter and the Parity bit will be described in the implementation of the improved counter of this invention.

Figure 3:
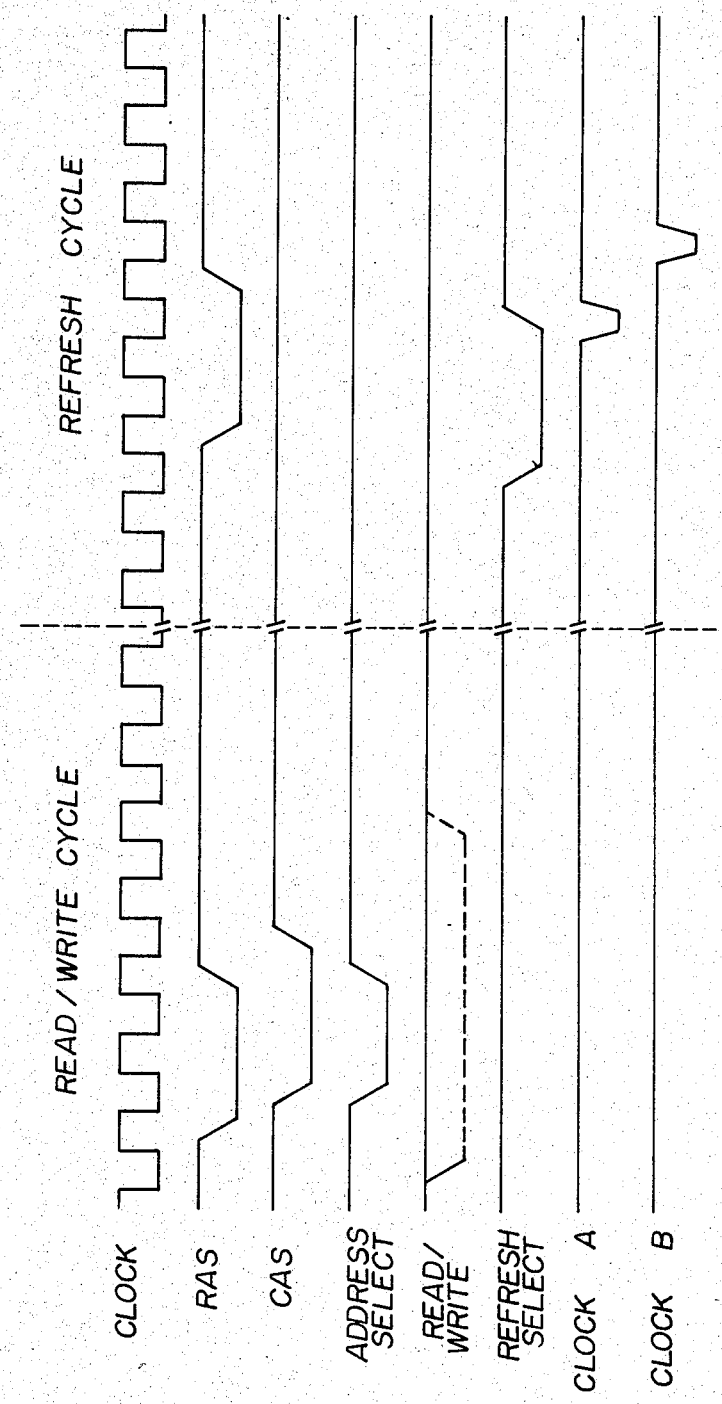
FIG. 3 is an idealized waveform illustrating and Read/Write cycle in a volatile memory system, together with a Refresh cycle.

FIG. 3 is an idealized waveform illustrating a Read/Write cycle in a volatile memory system, together with a Refresh cycle. A clock signal is provided by Timing and Control for use in timing and synchronizing the various operations of the logic circuits and the Memory Units in the memory system. The clock signals can be adapted from a central clocking system for the data processing system, or can be generated and synchronized within the Timing and Control circuitry.

The Row Address Strobe (RAS) is active when the signal goes low. The Column Address Strobe (CAS) is also active when the signal goes low. The RAS and CAS signals are generated by the Timing and Control, and are for activating circuits for accessing the rows and columns of memory cells, respectively.

The Address Select is provided for selecting the applied Address that will be utilized in conjunction with RAS and CAS to identify the particular addressable locations to be accessed. The Address Select is active when the signal goes low.

The Read/Write selection signals are utilized to determine whether data will be written into the memory or will be read from the memory. The Read selection is a high signal and the Write selection is a low signal. Obviously, these are mutually exclusive, and will depend upon the selection received from the associated data processing unit.

The Refresh Select, Clock A and Clock B, will be maintained at the high level during the Read or Write cycle, thereby indicating that none of the Refresh circuitry will be activated.

Considering the Refresh cycle, it is seen that the RAS is active, CAS is held inactive, the Address Select is held inactive, and the Read/Write select signal is maintained at the high or Read level. Under these conditions, the occurrence of the Refresh Select causes the contents of the Refresh Counter to be selected for addressing the Memory Units. The occurrence of the Clock A signal and the Clock B signal cause the Refresh Counter to advance one Gray code count and cause the Parity bit to be generated, and conditions the Counter Error Detector circuitry to perform the error detecting function.

It is of course understood that each Refresh cycle will be initiated by the Timing and Control, and these Refresh cycles can be generated in a first mode to refresh many or all of the addressable locations, or can be interleaved with Read and Write cycles. These selections will depend upon the timing requirements and physical characteristics of the Memory Units and the data processing system in which the memory system will be utilized.

Before describing the detailed logical functioning of the circuitry employed, signal level identification and diagram conventions will be described. In the detailed logic drawings, half arrowheads are utilized to indicate the direction of signal flow, and to define operational signal level conditions for the logic element involved. A binary one is considered as a high signal, and a binary zero is considered as a low signal. A closed half arrowhead indicates a high signal considered as operative, while an open half arrowhead indicates a low signal as operative. These relationships will be considered more fully with regard to the individual logic circuit elements employed.

FIG. 4 is a logic block diagram of an OR circuit providing true and complement output signals. This circuit contemplates the use of four input signals designated F, G, H, and J, for providing the true output Y and complement output X. The closed arrowheads indicate that the operative conditions are high signals, thereby indicating that a high input signal on any of input lines F, G, H, or J will result in a high signal on input terminal Y and a low output signal on output terminal X. It is of course understood that not all input lines have to be used. If unused, an input line can be connected to a reference inactive level, or for some embodiments, can be allowed to float.

FIG. 5 is a Truth Table defining the functional relationships of the input to the output signals for the OR circuit of FIG. 4.

FIG. 6 is a logic block diagram sample of a Low AND circuit providing true and complement output signals. Essentially, this Low AND circuit provides the inverse operation of the OR circuit of FIG. 4. The input terminals F, G, H and J must all receive low input signals in order for the output signal Y to be low and the output signal X to be high. Again, reference to FIG. 5 indicates the Truth Table functional relationship of the input signal combinations to the output signals provided.

FIG. 7a is a logic block diagram of an Exclusive-OR (XOR) circuit. This circuit responds to high input signals, and will provide a low output signal X only under the conditions that one and only one of the input terminals, F, G, H, or J receive a high input signal, while the remaining input terminals receive low input signals. The logical function of the XOR circuit is shown in FIG. 7b, which is a Truth Table of the logical functioning of the Exclusive-OR (XOR) circuit of FIG. 7a.

FIG. 8a is a logic block diagram of a Latch circuit. The Latch can be considered as a bistable device or otherwise designated as a flip-flop. The functioning is such that the data input signals are applied to input terminals D and B, either of which will be operative to set the Latch when it is properly conditioned. The control signals are the Clock (C) and the End (E). The arrow designation indicates that the E signal is low active, while the C input is high active. The occurrence of a high C and a high E signal will result in the Latch being cleared such that the output terminal X carries a high signal and output terminal Y carries a low signal. The occurrence of a low signal at the E input terminal in combination with a high signal at either D or B will result in the Latch being set with the Y output signal high and the X output signal low.

FIG. 8b is a detailed logic symbol illustration of the Latch of FIG. 8a. The various combinational actions can be traced through the circuit, and will not be described in detail.

FIG. 8c is the Truth Table describing the functioning of the Latch of FIG. 8a.

FIG. 8d is a logic block diagram symbol for a Latch the sets on S. The occurrence of a high S and a high E results in the Latch being set with a high output at Y and a low output at X.

FIG. 8e is a detailed logic symbol illustration of the Latch of FIG. 8d, and permits the examination of the combination of ANDs, ORs and Inverters used to construe this bistable device.

FIG. 8f is a Truth Table describing the functioning of the Latch of FIG. 8d.

The logic elements described thus far can be constructed from discrete components, but it is understood that the preferred embodiment is to be constructed from logic cells developed and interconnected in gate array fabrication technology. The implementation of these types of logic elements are known to those skilled in the art, and will not be described further.

Figures 9, 9B:
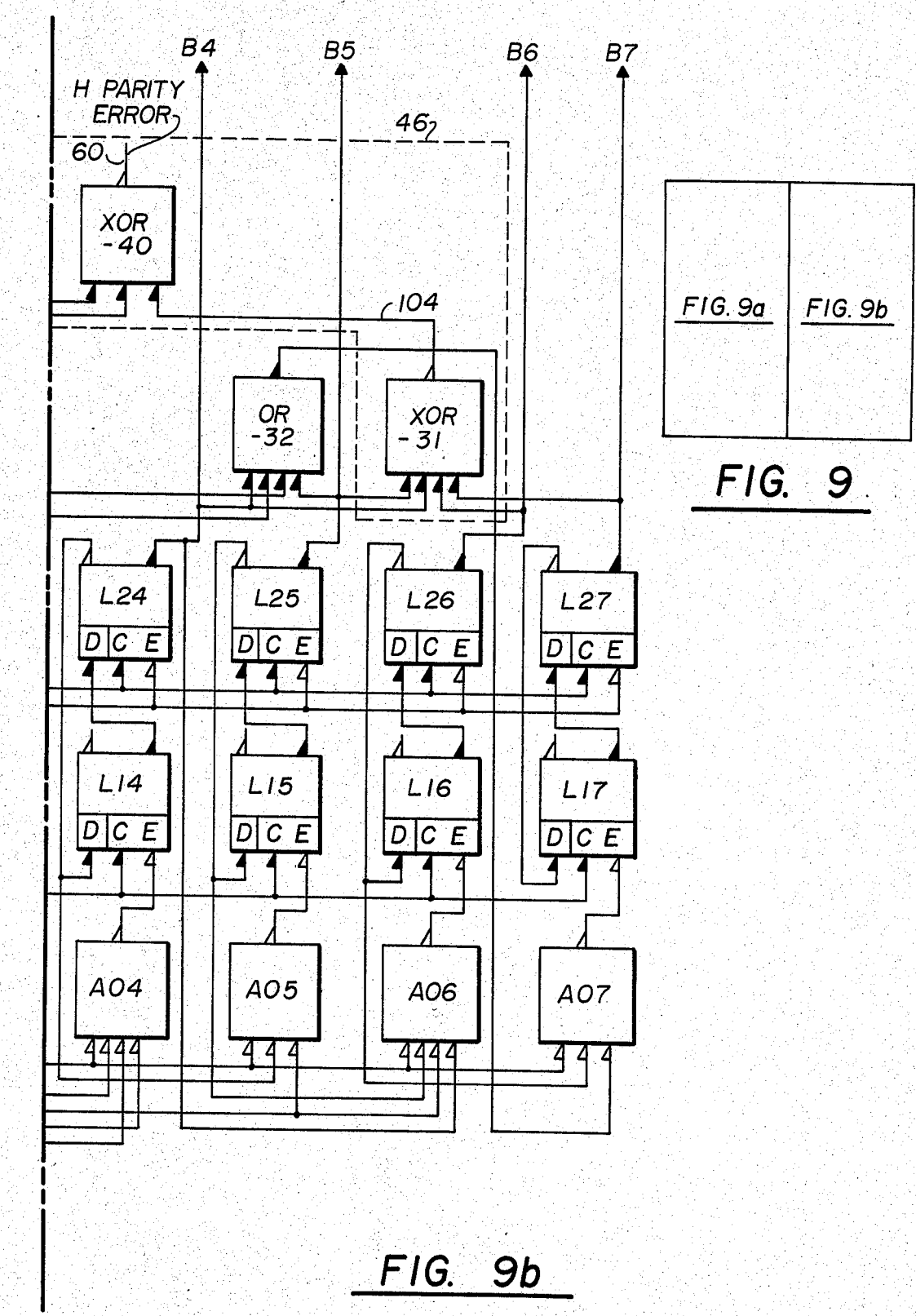
FIG. 9a and FIG 9b, when arranged as shown in FIG. 9, is a detailed logic block diagram of the Gray code counter, together with parity generating circuitry and error detecting circuitry.
Figure 9A:
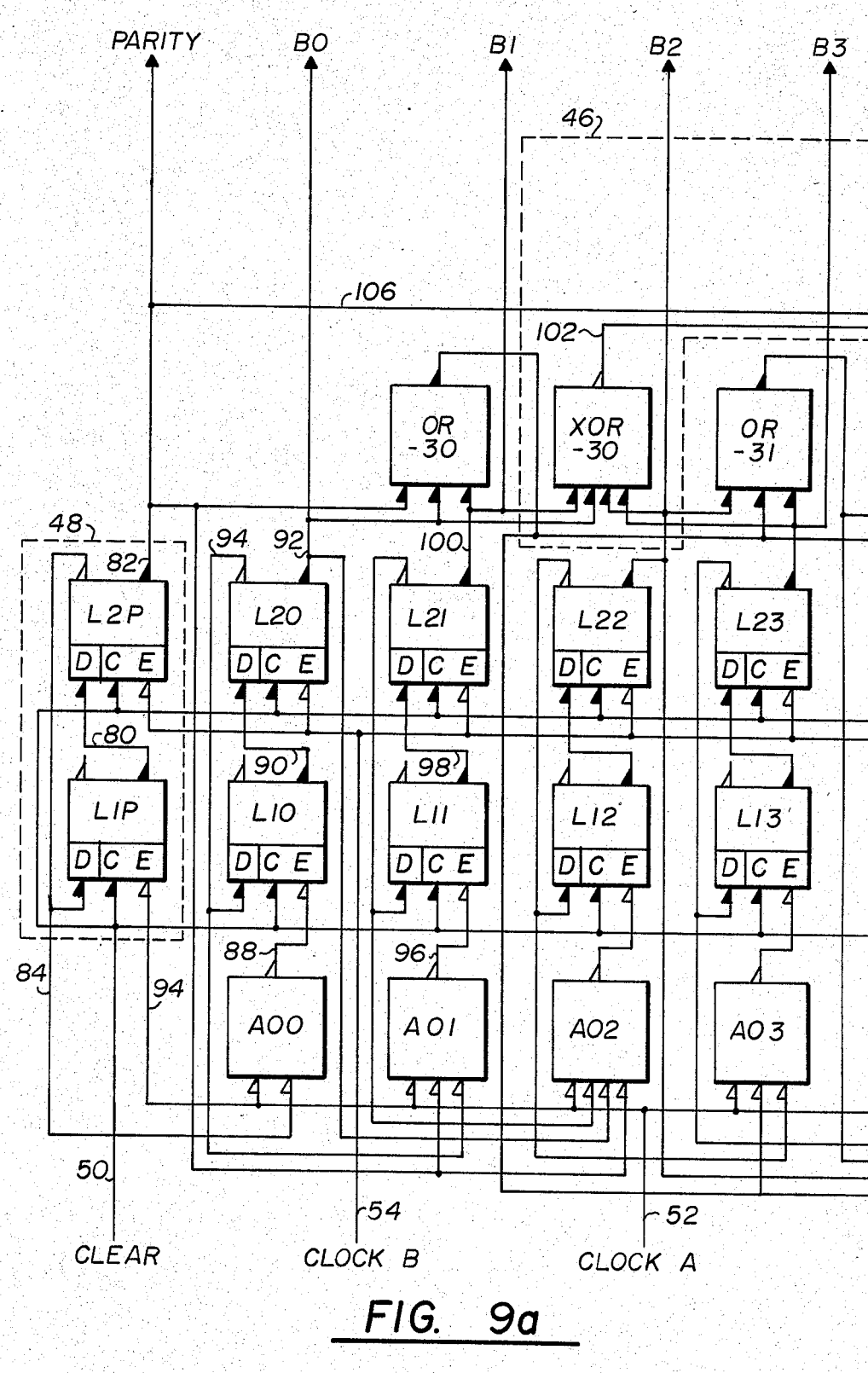

FIG. 9a and FIG. 9b, when arranged as shown in FIG. 9, is a detailed logic block diagram of the Gray code counter, together with Parity generating circuitry and the error detecting circuitry. The Counter Error Detector circuitry described in FIG. 1 is shown enclosed in dashed block 46, and the Refresh Parity Generator is shown enclosed in dashed block 48. The balance of the logic circuitry of FIG. 9a and FIG. 9b comprise the Refresh Counter 44.

The Gray code counter embodiment to be described will incorporate logic circuits to provide an 8-bit refresh count. The counter is comprised of a first rank of Latches L10 through L17, a second rank of Latches L20 through L27, and a rank of advance count code generating circuits comprised of Low AND circuits A00 through A07. In this notation, the number adjacent the letter designation represents the rank, and the second numerical designation represents the function or bit position.

In the configuration illustrated, it is the primary function of the first rank of Latches to form the count, and it is the primary function of the second rank of Latches to receive and store the current count for use as the output from the counter and for use as feedback to the first rank of Latches for forming the next subsequent count. Each count is formed from the state of the previous count, and is determined by the count advance code generating circuits A00 through A07. As previously described the status of the Parity is important in the determination of the count advancement.

The Refresh Parity Generator, shown enclosed in dashed block 48, is comprised of Latches L1P and L2P, which are Latches of the type illustrated in FIG. 8d. At initialization, the Clear signal applied on line 50 will go high. The Clock A signal received on line 52 will not be present and line 52 will be high, so Latch L1P will be set with a high output signal on line 80. At the same time, the high Clear signal to the S input terminal of Latch L2P, together with the high state received on Clock B line 54, will cause Latch L2P to be set and provide a high signal on line 82 and a low signal on line 84. The high signal on line 82 results in an indication of Parity of one, and will be appropriate for the clear state of the Refresh Counter 44. In this regard see the decimal zero line in FIG. 2. The complement, or low signal on line 84 is applied to condition the D input terminal of Latch L1P, and as one of the input signals to Low AND circuit A00. When the Clear signal on line 50 is allowed to go low, the Latches L1P and L2P will be responsive to the clocking signals Clock A and Clock B, respectively, for alternating the Parity bit for each advancement of the counter.

The Refresh Counter Latches L10 through L17 and L20 through L27 are of the type latch described in FIG. 8a. These Latches are of the clearing type and respond to the high Clear signal on line 50 to clear all of the stages in both ranks of Latches when signals are applied to the E terminals of each of the Latches. The latter condition will be satisfied during initial Clear, since both the Clock A and Clock B lines will be held high, thereby causing Low AND circuits A00 through A07 to provide high input signals to associated E terminals of Latches L20 through L27 will provide low or zero output signals on output lines B0 through B7 respectively.

For the advancement of the Refresh Counter, the Clock A line is driven low, and this low signal in conjunction with the low Parity signal provided on line 84 to A00 will result in a low signal on line 88 to the E input terminal of L10. This low signal on line 88 in conjunction with the high signal to D input terminal of L10 from the complement output terminal of L20 results in L10 being set to a one and providing a high output signal on line 90. When Clock B input signal on line 54 goes low, L20 has a low signal applied to its E input terminal, which in conjunction with the one high signal received on line 90 will result in L20 being set to provide a high output signal on line 92. When Clock A and Clock B again go high, this one condition will be set in the Refresh Counter. At the same time, when Clock A goes low, L1P receives a low signal on line 94, thereby enabling it to be placed in the cleared condition from the low signal received on line 84. This results in a low signal on line 80 that causes L2P to be switched to provided a low output signal at line 82 upon the enabling occurrence of alternate Clock B signal. It can be seen, then, that the occurrence of alternate switching of L1P and L2P to provide the appropriate Parity at output line 82.

The true output terminal of L2P is coupled through line 82 to A01 and A02, and each time that Parity goes to zero or low, A01 and A02 will be satisfied from a consideration of the Parity.

The complement output from L20 is applied by line 94 to the D input terminal of L10 and as one of the input signals to A01. Having set L20 to the one state on the occurrence of the first Clock A and Clock B sequence, a low signal will be present on line 94 which will be applied to A01. Upon the occurrence of the second Clock A signal, A01 will have all low input signals applied and will provide a low signal on line 96. The high complement signal applied from L21 to the D input of L11 will result in L11 being set to one with a high signal on line 98. This in turn will cause L21 to be set to the one state for providing a high output signal on line 100 upon the occurrence of the second Clock B signal. It will be noted that upon the second Clock A signal going low, A00 will not be satisfied due to the high complement Parity signal received on line 84. This results in a high signal on line 88 which causes L10 to remain in the latched one state, and further results in L20 staying in the last one state, and further results in L20 staying in the last one state with a one provided on line 92. This condition results in the Gray code of 11 in the bit positions B0 and B1 with zeros in all higher ordered conditions and a Parity of zero. See FIG. 2 decimal line 2.

The third occurrence of a pair of Clock A and Clock B pulses will result in the Parity Latches being reversed, the zero position Latches L21 and L11 remaining unaltered. It can be seen, then, that the complement output terminal of each of the Latches L20 through L27 are coupled back to the D input terminals of respectively associated Latches L10 through L17, and that the same complement output terminal, with the exception of L27, is coupled to the next higher ordered Low AND circuit. In the higher ordered counting stages OR-30, OR-31, and OR-32 are utilized to properly condition associated ones of Low AND circuits A03 through A07. Having described the detailed logic circuit of the arrangement and the application of Clock A and Clock B pulses through the lower ordered two stages, it is clear how the Refresh Counter operates without tracing each of the combinations of iterations through the counter logic. It will be recalled from a consideration of FIG. 2 that the value provided as B0 from the Latch L20 will change each time the previous Parity state of L2P is one. The state of L21 will change resulting in a Chnage of B1 each time the previous B0, that is the state of L20, is one and the previous Parity is zero. For any higher ordered bit position, a change will occur when it is determined that the next lower ordered bit position is one and all other lower ordered bit positions are zero and the previous Parity is zero. As stated, it is not deemed necessary to trace each and every logical combination of the Refresh Counter, since operation will be readily apparent to those skilled in the art from a consideration of the detail logic diagram in consideration of the signal relationship herein described and the code identifications set forth in FIG. 2.

Finally, considering the operation of the Counter Error Detector shown enclosed in dashed block 46 it can be seen that XOR-30 receives input signals from the true output terminals of Latches L20 through L23 and provides an output signal on line 102 to XOR-40. Similarly, XOR-31 receives input signals from the true output terminals of Latches L24 through L27 and provides an output signal on line 104 to XOR-40. The third input signal to XOR-40 is received on line 106 from the true output terminal of the Parity Latch L2P. With reference to FIG. 7a and FIG. 7b, it will be recalled that the function of the XOR circuit is to provide a low output signal on its output terminal when one, and only one, of its input terminals receives a high signal. From a consideration of the code combinations of FIG. 2, it can be seen that there is no proper code combination that would permit of a one parity signal that would have the combination of count signals to XOR-30 and XOR-31 such that low signals would be provided on lines 102 and 104. Conversely, there is no signal combination that properly admits of a zero Parity with a combination that would provide a high signal on either line 102 at the same time as a low is provided on the other one of lines 102 or 104. Accordingly, if it ever occurs that one and only one input signal to XOR-40 is high while the other two input signals are low, an error in operation of the Refresh Counter 44 has been detected and a high signal on line 60 will indicate that an error in operation of the Refresh Counter 44 has been detected.

Having described the invention and a preferred embodiment thereof that satisfied the various stated purposes and objectives of the invention, without departing from the spirit and scope of the invention, what is intended to be protected by Letters Patent is set forth in the appended claims.

What is claimed is:

1. For use in a dynamic memory system, an improved memory refresh system comprising:

timing and control means for providing control signals for controlling access to the memory system and for controlling refreshing of the memory system;

refresh counter means responsively coupled to said timing and control means for generating memory addresses to be refreshed in response to predetermined ones of said control signals;

parity generating means responsively coupled to said timing and control means for generating the parity of the addresses generated by said refresh counter means in response to said predetermined ones of said control signals for allowing through-checking of refresh addresses so generated; and counter error detector means responsively coupled to said refresh counter means said refresh parity generator means for detecting errors in operation of said refresh counter means and providing signals indicative of the occurrence of said detected errors.

2. A memory refresh system as in claim 1, wherein said refresh counter means comprises Gray code counter means for generating said memory addresses to be refreshed in a predetermined sequence wherein no more than one binary digit is altered to form successive ones of said memory addresses to be refreshed.

3. A memory refresh system as in claim 2, wherein said Gray code counter includes:

a first plurality of latch means, each for a least temporarily storing an associated digit of said memory addresses to be refreshed;

a second like plurality of latch means, each associated with an individual predetermined one of said latch means in said first plurality of latch means, and arrange for receiving said memory addresses to be refreshed from said first plurality of latch means and at least temporarily storing said memory addresses to be refreshed, and further including output means for providing output signals indicative of said memory addresses to be refreshed;

code generating means responsive coupled to said parity generating means, to said second plurality of latch means, and to said timing and control means for generating code signals in a predetermined sequence to be applied to said first plurality of latch means in response to said predetermined ones of said control signals.

4. An improved memory refresh system as in claim 1, wherein said parity generating means includes:

first and second latch means intercoupled for alternately switching states in response to predetermined ones of said control signals.

5. An improved memory refresh system as in claim 1, wherein said counter error detector means includes first exclusive-OR means responsively coupled to said refresh counter means for providing first error checking signals indicative of the status of the said memory addresses to be refreshed stored in said refresh counter means; and second exclusive-OR means responsively coupled to said first exclusive-OR means and said parity generating means for providing said signal indicative of the occurrence of said detected errors when an improper combination of said memory addresses to be refreshed and parity is detected.

6. An improved dynamic memory system in combination comprising:

a plurality of dynamic memory units, each including dynamic memory cells arranged in rows and columns, and having associated circuitry for accessing addressed ones of said cells and further including address parity checking circuitry;

timing and control means for receiving memory system access request signals and for providing first control signals for controlling access to said plurality of memory units and for providing second control signals for controlling refreshing of said plurality of memory units;

memory address register means for receiving memory addresses to be accessed, said memory addresses including parity signals associated therewith;

refresh counter means responsively coupled to said timing and control means for generating refresh addresses in response to said second control signals;

refresh parity generator means responsively coupled to said timing and control means for generating parity signals accociated with said refresh addresses generated by said refresh counter means;

counter error detector means responsively coupled to said refresh counter means and said refresh parity generator means for detecting errors in operation of said refresh counter means and providing error indicating signals indicative of detected errors;

selector means coupled to said memory address register means, said refresh counter means, said refresh parity generator means, and said timing and control means for selecting said memory addresses and said parity signals associated therewith in reponse to said first control signals and for selecting the said refresh addresses and said parity signals associated with said refresh addresses in response to said second control signals, said selector means including means for applying the selected addressing signals with associated parity signals to said plurality of memory units.

7. A memory refresh system as in claim 6 wherein said refresh counter means comprises Gray code counter means for generating said memory addresses to be refreshed in a predetermined sequence wherein no more than one binary digit is altered to form successive ones of said memory addresses to be refreshed.

8. A memory refresh system as in claim 7, wherein said Gray code counter includes:

a first plurality of latch means, each for at least temporarily storing an associated binary digit of said memory addresses to be refreshed;

a second like plurality of latch means, each associated with an individual predetermined one of said latch means in said plurality of latch means, and arranged for receiving said memory addresses to be refreshed from said first plurality of latchmeans and at least temporarily storing said memory addresses to be refreshed, and further including output means for providing output signals indicative of said memory addresses to be refreshed;

code generating means responsively coupled to said refresh parity generator means, to said second plurailty of latch means, and to said timing and control means for generating code signals in a predetermined sequence to be applied to said first plurality of latch means in response to said second control signals.

9. An improved memory refresh system as in claim 6, wherein said refresh parity generator means includes:

first and second latch means intercoupled for alternately switching states in response to predetermined ones of said second control signals.

10. An improved memory refresh system as in claim 6, wherein said counter error detector means includes first exclusive-OR means responsively coupled to said refresh counter means for providing first error checking signals indicative of the status of the said memory addresses to be refreshed stored in said refresh counter means; and second exclusive-OR means responsively coupled to said first exclusive-OR means and said refresh parity generator means for providing said error indicating signals indicative of said detected errors when an improper combination of said memory addresses to be refreshed and parity is detected.

11. An improved counter for use with dynamic memories comprising:

input means for receiving control signals;

parity generating means coupled to said input means for generating parity signals;

code counter means coupled to said input means and said parity generating means for generating memory addresses in a predetermined sequence wherein no more than one binary digit is altered to form successive ones of said memory addresses, said code counter means including a first plurality of latch means, each for at least temporarily storing an associated binary digit of said memory addresses;

a second like plurality of latch means, each associated with an individual predetermined one of said latch means in said first plurality of latch means, and arrange for receiving and at least temporarily storing said memory addresses formed in said first plurality of latch means, and further including output means for providing output signals indicative of said memory addresses;

code generating means responsively coupled to said parity generating means, to said second plurality of latch means, and to said input means, for generating code signals in a predetermined sequence to be applied to said first plurality of latch means in response to said predetermined ones of said control signals.

12. An improved memory refresh system as in claim 11, wherein said parity generating means includes:

first and second latch means intercoupled for alternately switching states in response to predetermined ones of said control signals.

13. An improved counter as in claim 12 and further including counter error detector means coupled to said code counter means and said parity generating means for detecting errors in operation of said code counter means and providing error signals indicative of the occurrence of detected errors.

14. An improved memory refresh system as in claim 13, wherein said counter error detector means includes first exclusive-OR means responsively coupled to said code counter means for providing first error checking signals indicative of the status of the said memory addresses stored in said code counter means; and second exclusive-OR means responsively coupled to said first exclusive-OR means and said parity generating means for providing said error signals indicative of the occurrence of said errors when an improper combination of said memory address and parity is detected.

* * * * *

UNITED STATES PATENT AND TRADEMARK OFFICE
CERTIFICATE OF CORRECTION

PATENT NO. : 4,528,665

DATED : June 9, 1985

INVENTOR(S) : Gary D. Burns, Donald W. Mackenthun, and Scott D. Schaber

It is certified that error appears in the above-identified patent and that said Letters Patent is hereby corrected as shown below:

Column 13, Line 5, after "means" insert -- and --.

Line 20, after "associated" insert -- binary --.

Column 16, Line 30, "address" should be -- addresses --.

Signed and Sealed this

First Day of October 1985

[SEAL]

Attest:

Attesting Officer

DONALD J. QUIGG

Commissioner of Patents and Trademarks—Designate